US010728882B2

(12) United States Patent
Wang et al.

(10) Patent No.: US 10,728,882 B2
(45) Date of Patent: Jul. 28, 2020

(54) METHOD FOR ALLOCATING AGGREGATE MAXIMUM BIT RATE OF UE, METHOD FOR ALLOCATING AGGREGATE BIT RATES OF NON-GBR SERVICES AND BASE STATIONS

(71) Applicant: Samsung Electronics Co., Ltd, Gyeonggi-do (KR)

(72) Inventors: Hong Wang, Beijing (CN); Lixiang Xu, Beijing (CN); Xiaowan Ke, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/673,507

(22) Filed: Mar. 30, 2015

(65) Prior Publication Data

US 2015/0282152 A1  Oct. 1, 2015

(30) Foreign Application Priority Data

Mar. 28, 2014 (CN) .......................... 2014 1 0123886

(51) Int. Cl.
*H04W 72/04* (2009.01)
*H04W 28/22* (2009.01)
(Continued)

(52) U.S. Cl.
CPC ....... *H04W 72/0406* (2013.01); *H04L 5/0092* (2013.01); *H04W 28/22* (2013.01); *H04W 88/08* (2013.01)

(58) Field of Classification Search
CPC ..... H04W 72/04; H04W 88/08; H04W 28/22; H04W 72/0406; H04L 5/00; H04L 5/0092
(Continued)

(56) References Cited

U.S. PATENT DOCUMENTS

2011/0275359 A1  11/2011 Sebire et al.
2012/0302240 A1  11/2012 Tamaki et al.
(Continued)

FOREIGN PATENT DOCUMENTS

CN    103052116 A    4/2013
CN    103597875 A    2/2014
(Continued)

OTHER PUBLICATIONS

International Search Report dated Jul. 10, 2015 in connection with International Application No. PCT/KR2015/003088; 3 pages.
(Continued)

*Primary Examiner* — Kodzovi Acolatse
*Assistant Examiner* — Abdeltif Ajid

(57) ABSTRACT

A method for allocating an aggregate maximum bit rate (AMBR) of a user equipment (UE) includes obtaining, by a master base station (MeNB), the AMBR of the UE (UE-AMBR), and obtaining, by the MeNB, information for allocating an AMBR of a secondary base station (SeNB), and allocating, the AMBR of the SeNB according to the information, wherein a sum of the AMBRs of the MeNB and the SeNB is not greater than the UE-AMBR. A method for coordinating aggregate bit rates of non-GBR services between base stations includes sending, by an SeNB, information for allocating an aggregate maximum bit rate (AMBR) of the SeNB to an MeNB, and receiving, by the SeNB, the AMBR allocated by the MeNB.

20 Claims, 11 Drawing Sheets

(51) Int. Cl.
H04L 5/00 (2006.01)
H04W 88/08 (2009.01)

(58) Field of Classification Search
USPC .......................................... 370/329
See application file for complete search history.

(56) References Cited

U.S. PATENT DOCUMENTS

| | | | |
|---|---|---|---|
| 2013/0016630 A1 | 1/2013 | Bhushan et al. | |
| 2013/0107799 A1 | 5/2013 | Karlsson et al. | |
| 2014/0295849 A1* | 10/2014 | Sirotkin | H04L 65/604 455/437 |
| 2015/0049610 A1 | 2/2015 | Kim et al. | |
| 2016/0050652 A1* | 2/2016 | Wu | H04W 28/24 370/329 |
| 2016/0105877 A1* | 4/2016 | Yi | H04W 72/1205 370/329 |
| 2017/0026982 A1* | 1/2017 | Koskinen | H04W 28/22 |
| 2018/0049093 A1* | 2/2018 | Ahluwalia | H04W 36/22 |

FOREIGN PATENT DOCUMENTS

| | | | | |
|---|---|---|---|---|
| EP | 2753035 A2 * | 7/2014 | | |
| EP | 2753035 A2 * | 7/2014 | ............ | H04W 28/22 |
| WO | 2013053339 A2 | 4/2013 | | |
| WO | WO 2013/104416 A1 | 7/2013 | | |
| WO | WO 2013/141625 A1 | 9/2013 | | |

OTHER PUBLICATIONS

Samsung; "On the UE-AMBR in Dual Connectivity"; 3GPP TSG RAN WG2 #85; R2-140413; Feb. 10-14, 2014; Prague, Czech Republic; 3 pages.

Communication from a foreign patent office in a counterpart foreign application, European Patent Office, "Supplementary European Search Report," Application No. EP15769834.1, dated Oct. 18, 2017.

NSN, Nokia Corporation, "UE AMBR enforcement for dual connectivity," R2-140376, 3GPP TSG-RAN WG2 Meeting #85, Prague, Czech Republic, Feb. 10-14, 2014, 4 pages.

Alcatel-Lucent Shanghai Bell, et al., "UE AMBR coordination in dual connectivity," R2-141500, 3GPP TSG-RAN WG2 Meeting #85bis, Valencia, Spain, Mar. 31-Apr. 4, 2014, 2 pages.

First Office Action regarding Chinese Patent Application No. 201410123886.9, dated Dec. 3, 2018, 17 pages.

Office Action dated Mar. 23, 2020 in connection with India Patent Application No. 201637029872, 6 pages.

* cited by examiner

FIG. 5

| Non-GBR bearer established on the base station 1 | non-GBR bearer established on the base station 2 | AMBR |
|---|---|---|
| QCI =n | QCI =n | divide equally |
| QCI=5 (delay = 100ms) | QCI=7 (delay = 100ms) | divide equally |
| QCI=5 (delay = 100ms) | QCI =8 or QCI = 9(delay =300ms) | 3 to 1 |
| QCI=6 (delay = 300ms) | QCI =8 or QCI = 9(delay =300ms) | divide equally |
| QCI=6 (delay = 300ms) | QCI = 5 or QCI=7(delay = 100ms) | 3 to 1 |

METHOD FOR ALLOCATING AGGREGATE MAXIMUM BIT RATE OF UE, METHOD FOR ALLOCATING AGGREGATE BIT RATES OF NON-GBR SERVICES AND BASE STATIONS

CROSS-REFERENCE TO RELATED APPLICATION AND CLAIM OF PRIORITY

The present application is related to and claims the benefit under 35 U.S.C. § 119(a) to Chinese Patent Application No. 2014-10123886.9, filed on Mar. 28, 2014, the entire disclosure of which is hereby incorporated herein by reference.

TECHNICAL FIELD

The present disclosure relates to wireless communication technologies, and more particularly, to a method for allocating an aggregate maximum bit rate of a UE, a method for coordinating aggregate bit rates of non-GBR services and base stations thereof.

BACKGROUND

A trend of modern mobile communication is towards multimedia service which provides high-rate transmissions for users.

A problem of the prior art is that under a condition of dual connectivity (dual connectivity), data bearers of the non-GBR services are established on different base stations, both the MeNB and the SeNB need to obtain the aggregate maximum bit rates of data bearers of the non-GBR services which are controlled by themselves, and the sum of the aggregate maximum bit rates of both base stations cannot exceed the UE-AMBR. How to determine the aggregate maximum bit rates of the MeNB and SeNB is not referred to a current technology. Another problem is how to coordinate the aggregate maximum bit rates of both base stations, which is also not referred to the current technology.

SUMMARY

To address the above-discussed deficiencies, it is a primary object to provide a method for allocating an AMBR of a base station, to allocate the AMBR for each base station when the non-GBR services are established on different base stations The present disclosure also provides a method for coordinating aggregate bit rates of non-GBR services between base stations to reduce data transmission delay by effectively using limited bearer bandwidth.

A method for allocating an AMBR of a UE provided by the present disclosure includes obtaining, by a master base station (MeNB), the AMBR of the UE (UE-AMBR), and obtaining, by the MeNB, information for allocating an AMBR of a secondary base station (SeNB), and allocating, the AMBR used by the SeNB according to the information, wherein the sum of the AMBRs of the MeNB and the SeNB is no more than the UE-AMBR.

In some embodiments, the UE-AMBR is the highest rate of all non-GBR services of the UE.

In some embodiments, the information for allocating the AMBR of the SeNB includes one or more of a quality of service requirement (e.g. QCI) of a non-GRB service bearer, a current aggregate bit rate of the non-GRB service on the SeNB, a historical aggregate bit rate of the non-GRB service on the SeNB, buffer information of the non-GRB service bearer on the SeNB, a resource status of the non-GRB on the SeNB, and a requirement of an increase or a decrease from the SeNB.

In some embodiments, the method further includes receiving, the current or historical aggregate bit rate of the non-GRB service on the SeNB from the SeNB.

In some embodiments, the method further includes receiving, the buffer information of the non-GRB service bearer on the SeNB from the SeNB.

For the above method, a base station provided by the present disclosure includes an AMBR obtaining module and an AMBR allocating module, wherein the AMBR obtaining module is configured to obtain an aggregate maximum bit rate (AMBR) of a UE (UE-AMBR), and the AMBR allocating module is configured to obtain information for allocating an AMBR of a secondary base station (SeNB) and allocate the AMBR used by the secondary base station according to the information.

A method for coordinating aggregate bit rates of the non-GBR services between base stations also provided by the present disclosure includes sending, by a SeNB, information for allocating an aggregate maximum bit rate (AMBR) of the SeNB to a MeNB, and receiving, by the SeNB, the AMBR allocated by the MeNB.

In some embodiments, the information for allocating the AMBR of the SeNB includes a current aggregate bit rate of the non-GRB service on the SeNB, a historical aggregate bit rate of the non-GRB service on the SeNB, buffer information of the non-GRB service bearer on the SeNB, resource information of the non-GRB on the SeNB, or a requirement of an increase or a decrease from the SeNB.

In some embodiments, the AMBR allocated by the MeNB is received through an X2 signal or X2 user plane.

For the above method, a base station provided by the present disclosure includes an information providing module and an information receiving module, wherein the information providing module is configured to send information for allocating an aggregate maximum bit rate (AMBR) of a SeNB to a MeNB, and the information receiving module is configured to receive the AMBR allocated by the MeNB.

It is thus clear from the above technical solution that, the method for allocating an AMBR of a base station and the method for coordinating aggregate bit rates of non-GBR services between base stations provided by the present disclosure can ensure that the sum of the aggregate maximum bit rates of both base stations is no more than the UE-AMBR, limited bearer bandwidth may be effectively utilized, and data transmission delay may be reduced.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 5 is a schematic flowchart of a method for allocating the aggregate maximum bit rate of a base station according to QCI by the MeNB of a third embodiment of the present disclosure;

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. To illustrate the object of the present disclosure, technical solutions and advantages more clearly, detailed description of the present disclosure will be given blow with reference to the accompanying drawings and embodiments.

To use the limited bearer bandwidth effectively, the application proposes that the aggregate bit rates need to be coordinated between two base stations, and thus when there is temporarily no data to transmit on the SeNB, the MeNB may increase its own aggregate maximum bit rate to send the non-GBR service data to the UE or a core network as soon as possible. Therefore, the coordination of aggregate bit rates between two base stations may use data bearer bandwidth effectively and reduce data transmission delay.

Therefore, the application provides methods for allocating the aggregate maximum bit rate and coordinating the aggregate bit rates between base stations, so that the base stations where each cell participates in carrier aggregation may obtain corresponding AMBRs through improvements of different network entities, and thus the sum of bit rates of all the non-GBR services of the UE is no more than the UE-AMBR and related services will be realized under a condition that the UE has multiple data bearers. In addition, the application also provides a technical solution of dynamic regulation in the aggregate bit rates between two base stations, which may use data bearer bandwidth effectively and reduce data transmission delay. Detailed description of the application will be given blow by several preferred embodiments.

Figure 1:
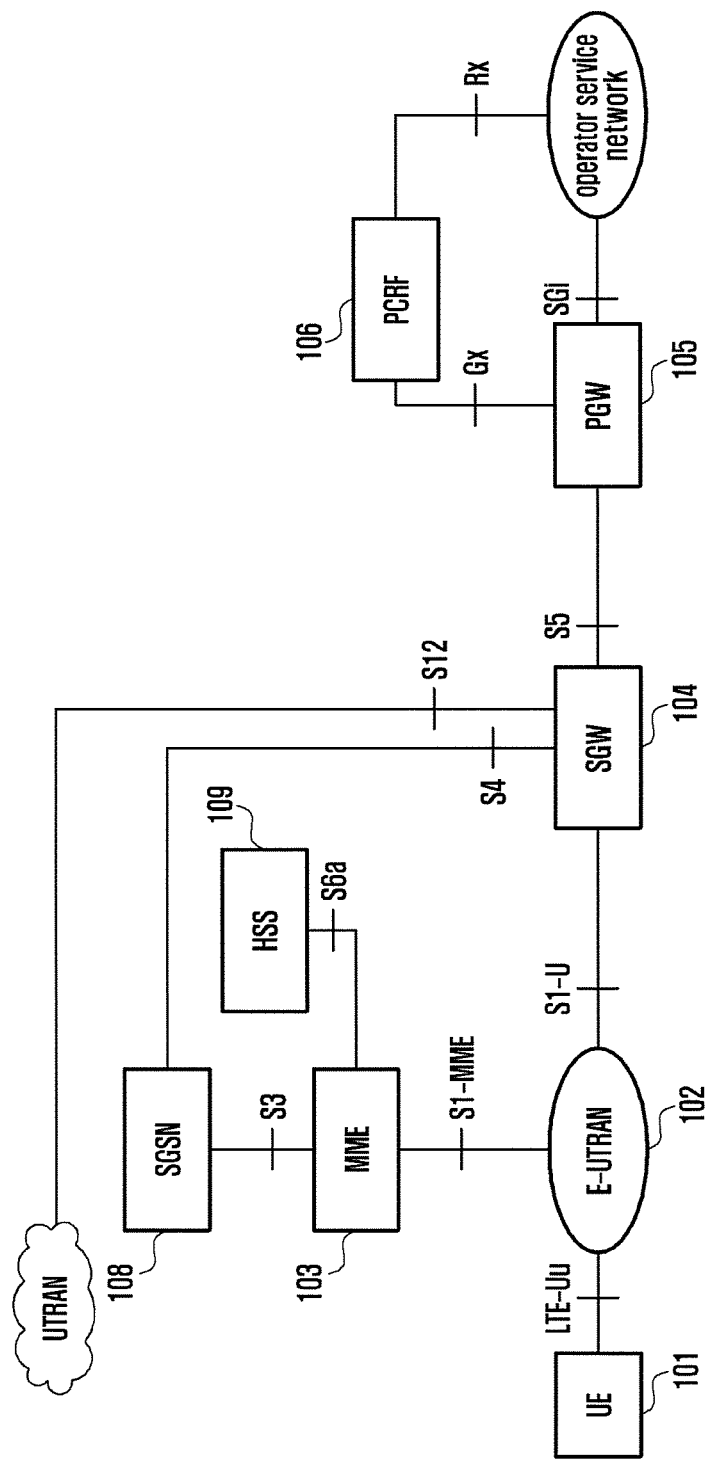
FIG. 1 is a system architecture diagram of the system architecture evolution (SAE)

FIG. 1 is a system architecture diagram showing the system architecture evolution (SAE).

In FIG. 1, user equipment (UE) 101 is a terminal device for receiving data. Evolved universal terrestrial radio access network (E-UTRAN) 102 is a wireless accessing network, wherein a macro base station (eNodeB/NodeB) is included to provide the UE with the wireless network interface access. Mobility management entity (MME) 103 is responsible for management of a mobile context, a session context and security information of the UE. Serving gateway (SGW) 104 mainly provides user surface function, and the MME 103 and the SGW 104 can be in a same physical entity. Packet data network gateway (PGW) 105, responsible for charging, monitoring, etc, can be in the same physical entity as the SGW 104. Policy and charging rules function (PCRF) 106 provides a policy of quality of service (QoS) and a charging rule. General packet radio service supporting node (SGSN) 108 is a network-node device which provides routing for data transmission in universal mobile telecommunications system (UMTS). Home subscriber server (HSS) 109 is a home subsystem of the UE which is responsible for protecting user information that includes current location of the user equipment, an address of a serving node, user security information, a packet data context, and so on.

In the LTE system, maximum bandwidth supported by each cell is 20 MHz. In order to increase a peak rate of the UE, a LTE-Advanced system introduces carrier aggregation technology. The UE can simultaneously communicate with a cell working at different carrier frequency and be controlled by a same eNB through carrier aggregation technology, which makes the highest transmission bandwidth reach 100 MHz, and thus can double uplink or downlink peak rate of the UE.

Figure 2:
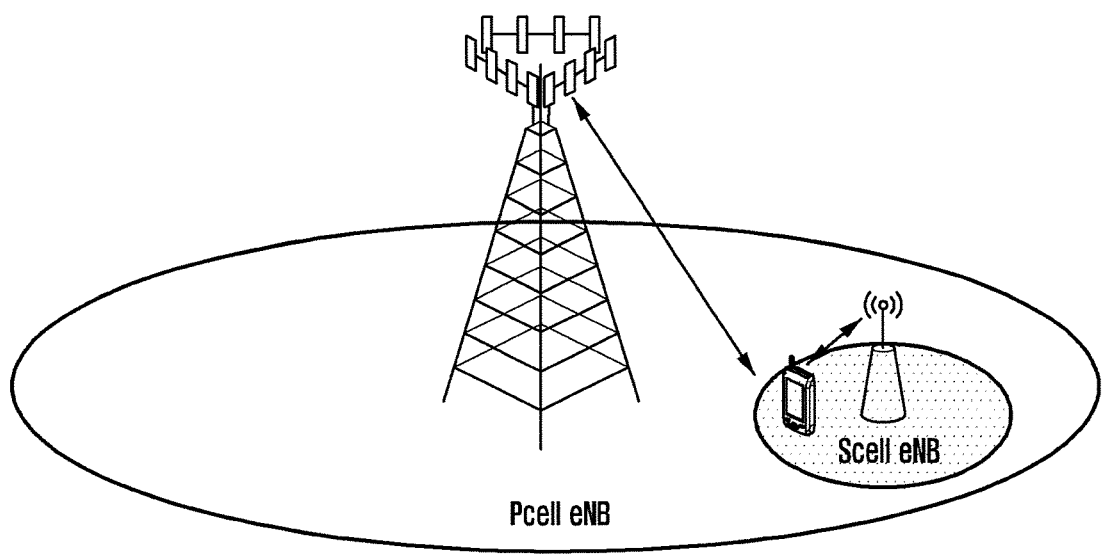
FIG. 2 is a schematic diagram of carrier aggregation across an eNB.

To increase the transmission bandwidth, multiple cells can provide services for the same UE, and these cells can be in the same base station or in the different base stations. This technology is called the carrier aggregation, also called the dual connectivity. For the UE working in the carrier aggregation, aggregated cells are divided into a primary cell (PCell) and a secondary cell (SCell), as shown in FIG. 2. There can be only one PCell which is always in an active state, the PCell can only be changed through a handover process, the UE can only send and receive a NAS message in the PCell, and PUCCH also can only be sent in the PCell. The PCell and the SCell can be in different base stations, and the base station of PCell called master base station MeNB (Master eNB) and the base station of SCell called secondary base station SeNB (Secondary eNB) are connected by an X2 interface.

The services of the UE can be classified as a guaranteed bit rate service (called GBR service) and a non-guaranteed bit rate service (called non-GBR service) according to different quality requirements. For the non-GBR service of the user, an aggregate maximum bit rate (called AMBR) and the sum of all the non-GBR bit rates no more than the AMBR are defined. The UE-AMBR set by the MME according to subscription information of the UE should be no more than the subscribed AMBR of the UE. Uplink and downlink data have their own UE-AMBR respectively. The base station has an uplink scheduling function through which a total rate of the non-GBR services transmitted simultaneously is no more than the UE-AMBR. For example, the uplink UE-AMBR is 10, and if two non-GBR services have data to be sent at some point, the base station can schedule the rate of each service to 5, and if only one non-GBR service has data to be sent, the base station can schedule the rate of the service to 10. The UE-AMBR is sent to the base station by the MME while the UE is entering a connection mode and the MME is establishing a context of the UE in the base station. In a certain implementation method, an initial context establishment request sent to the base station by the MME includes the UE-AMBR that is saved by the base station and then it is used for data scheduling. The data will be discarded, of which the rate exceeds the UE-AMBR.

Figure 3:
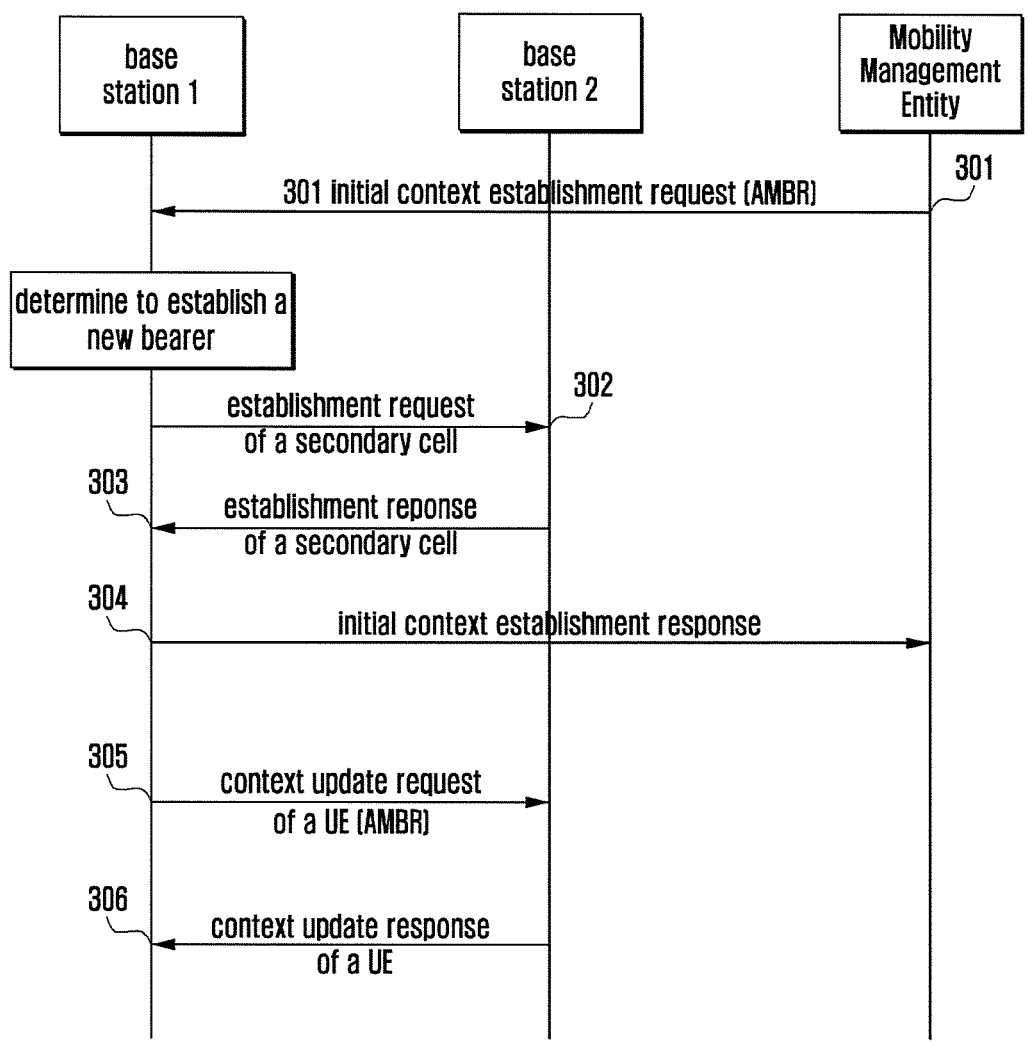
FIG. 3 is a schematic flowchart of a method for determining the aggregate maximum bit rate of the base station by the MeNB according to a first embodiment of the present disclosure.

According to one embodiment of the present disclosure, base station 1 establishes a data bearer of the user on base station 2, the MME set the aggregate maximum bit rates for the base stations, and the aggregate maximum bit rate of the UE is allocated between the base stations by an X2 interface, as shown in FIG. 3. The serving cell of the user is in the base station 1, that is, the primary cell of the user is in the base station MeNB, and the base station 2 is a SeNB that provides the user with the data bearer. The base station 2 receives downlink data from a serving gateway or the base station and sends it to the UE, and there is an X2 interface between the base station 1 and the base station 2. The embodiment omits signaling interacting between the base station and UE and between MME and gateway. The process in FIG. 3 can include following steps:

In step 301, the MME sends an initial context establishment request message to the base station 1.

The MME sends the message in order to establish a context of the UE on the base station 1. A procedure that the UE requests the serving cell of the base station 1 for RRC connection establishment is omitted before step 301, and the procedure is the same as that of the current RRC connection establishment. Also omit the procedure that the base station sends the MME the first uplink S1 interface message (initial UE message) which is sent to the MME by the base station of the serving cell of the UE after RRC connection establishment, and the procedure is the same as that defined in the current protocol.

The initial context establishment request message includes UE identification which identifies the user uniquely on the S1 interface. The message further includes the aggregate maximum bit rate (AMBR) of the UE (UE-AMBR) (UE Aggregate Maximum Bit Rate). The message further includes capability of the UE and LTE radio access bearer (E-RAB) information for establishing, which includes bearer identification, service quality of the bearer, a transport layer address of the serving gateway for receiving uplink data and tunnel port identification.

The message in step 301 can also be replaced by other messages such as a handover request message or an E-RAB establishment request message including the UE identification on the S1 interface and the UE-AMBR which is sent by the MME while the UE is entering a connection mode and the network is establishing a new bearer. The E-RAB establishment request message further includes capability of the UE and the E-RAB for establishing, which includes the bearer identification, service quality of the bearer, the transport layer address of the serving gateway and the tunnel port identification, for receiving uplink data.

In step 302, the base station 1 sends an establishment request message of a secondary cell to the base station 2 to request the base station 2 for establishing the new bearer for the UE. The message carries the aggregate maximum bit rate of the non-GRB service assigned for the base station 2.

The serving cell of the UE determines to establish the radio access bearer on the secondary cell that can be selected by the base station 1 according to quality of the wireless signal. If the secondary cell is in the base station 2, the base station 1 will send the message to the base station 2. The message name is not limited to the establishment request message of the secondary cell, but can be called other message names, and the message includes target cell (that is, the secondary cell where to establish the radio access bearer) identification, UE identification on the X2 interface and the E-RAB information for establishing, which includes the bearer identification, service quality information of the bearer, the transport layer address of the serving gateway and the tunnel port identification, for receiving uplink data.

The MeNB can assign the aggregate maximum bit rates (AMBRs) of the non-GBR services used for the MeNB and for the SeNB with reference to the following information.

1. quality of service (QoS) of the non-GRB service. In step 301, the MeNB obtains a quality of service requirement such as QCI that can indicate a service type, a delay requirement of service, UE priority and so on. According to this information, the MeNB allocates the aggregate bit rates that can be used by the MeNB and the SeNB to ensure that the sum of the aggregate bit rates is no more than the UE-AMBR. For instance, if a larger delay of the non-GBR service established on the SeNB can be tolerable and the delay of the non-GBR service established on the MeNB is much smaller, the MeNB can allocate a higher aggregate bit rate to the MeNB.

2. A current aggregate bit rate of the non-GRB service on the SeNB and a current aggregate bit rate of the non-GRB service on the MeNB. The MeNB records bit rates of all the non-GBR services of the UE on the MeNB in a period of time and can refer to bit rates of all the non-GBR services of the UE on the SeNB in the period of time, and then determine the maximum aggregate bit rates used by the MeNB and the SeNB in the next period of time. The MeNB obtains the bit rate of the non-GBR service of the UE on the SeNB over a period of time through the X2 interface, which is the actual aggregate bit rate of the non-GBR service including uplink or/and downlink. The specific process can be obtained by referring to a second embodiment.

3. The difference between actual aggregate bit rate reported by SeNB and aggregate bit rate allocated by MeNB. For example, the actual aggregate bit rate is 100, the aggregate bit rate allocated by MeNB is 150 and the difference of the aggregate bit rates is 50. In another method, the SeNB sends a message for increasing or decreasing the AMBR. The SeNB has saved the Qos requirement of service and knows whether the current data sending satisfies the requirement or not, so the SeNB can determine whether to request the MeNB to allocate more or less AMBR if the AMBR allocated to the SeNB does not satisfy the requirement of delay or on the basis of the compare between the actual AMBR and the AMBR allocated by the MeNB. The SeNB can send an increasing-AMBR message to the MeNB. Further, the SeNB can send a specific value of increasing. Or the SeNB can send a decreasing-AMBR message. Further, the SeNB can send a specific value of decreasing.

4. A buffer information of the non-GRB service on the MeNB and that on the SeNB. The MeNB records buffer information of all the non-GBR services of the UE established on the MeNB and can determine whether to allocate new maximum aggregate bit rates used by the MeNB and the SeNB with reference to the buffer information of all the non-GBR services of the UE established on the SeNB. The MeNB obtains the buffer information of the non-GBR service of the UE on the SeNB through the X2 interface, or obtains available or used resource on the SeNB through the X2 interface. The MeNB can increase or decrease the AMBR that can be available for the SeNB according to the resource, if the resource belongs to a UE. For example, there is much more available resource and transmission of the Non-GBR service is much faster, and the MeNB can decrease the AMBR of the UE on the SeNB under the condition that Qos requirement is satisfied. If the resource belongs to a whole cell, combination of user number on SeNB reported by X2 is needed, the MeNB can figure out available or used resource of the non-GBR service of each UE. On the basis of that, the MeNB can increase or decrease the AMBR that can be available for the SeNB.

In step 303, the base station 2 sends an establishment response message of the secondary cell to the base station 1.

The base station 2 confirms that the establishment of the secondary cell has been successful, and sends the message to the base station 1. The establishment response of the secondary cell includes information of the secondary cell newly added by the base station 2, a transport layer address of uplink data receiving and the tunnel port identification.

The information of the secondary cell can include physical cell identity (PCI) of the secondary cell, cell identity, cell PLMN identity and frequency and bandwidth of uplink and downlink of the cell, and can also include the number of antenna ports, information of MBSFN subframe and configuration of physical access channel (PRACH). The information of the secondary cell can further include common configuration of downlink dedicated channel (PDSCH) such as reference signal power of PDSCH, P-B. The information of the secondary cell can further include common configuration of physical repeat indicator channel (PHICH, Physical Hybrid ARQ Indicator Channel) such as duration time of PHICH that is normal or spread, resource of PHICH, etc. The message can include all or part of the above listed information.

In step 304, the base station 1 sends an initial context establishment response message to the MME.

The base station 1 informs the MME that the context of the UE has been successfully established, and simultaneously informs the MME bearer information of successful establishment of the base station. The message includes the UE identification on the S1 interface, the identification of radio access bearer that has been successfully established, the transport layer address of the base station of uplink and downlink data receiving and the tunnel port identification.

After receiving the message in step 304, the MME can obtain the transport layer address of downlink data receiving and the tunnel port identification immediately, and can inform the gateway the message in the following process to establish a tunnel of downlink data.

Corresponding to the step 301, the message can be replaced by other response messages corresponding with that of step 301.

The MeNB can allocate a new AMBR for the SeNB according to the method described in the step 302, and send it to the SeNB by the message of the X2 interface. Go to step 305 and 306.

In step 305, the base station 1 sends the base station 2 a context update request message of the UE that carries the new aggregate maximum bit rate AMBR used by the base station 2 and the UE identification on X2. The message name can be replaced by other names.

A new method of AMBR determined by the base station 1 is the same as that described in 302, which is omitted.

In step 306, the base station 2 sends a response message to the station 1. The context update request message of the UE can be adopted in this step.

According to another embodiment of the present disclosure, the operation for coordinating and regulating the aggregate bit rates between the station 1 and the station 2 is described in the embodiment, wherein the base station 1 to which the serving cell of the user belongs is the MeNB, the base station 2 is a SeNB that provides the user with the data bearer. The base station 2 receives downlink data from the serving gateway or the base station and sends it to the UE, and there is an X2 interface between the base station 1 and the base station 2. The embodiment omits signaling interacting between the base station and UE and between MME and gateway.

Figure 4A:
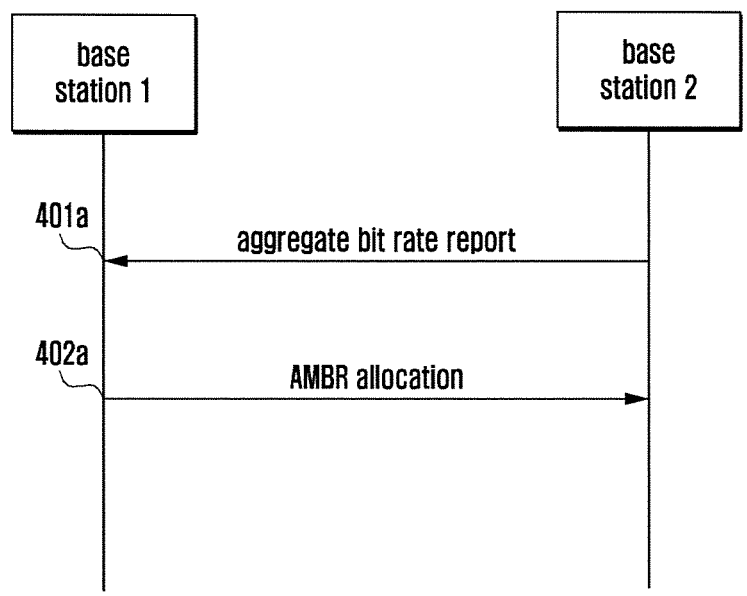
FIGS. 4A through 4D are schematic flowcharts of methods for coordinating aggregate bit rates between the MeNB and the SeNB of the second embodiment of the present disclosure.
Figure 4B:
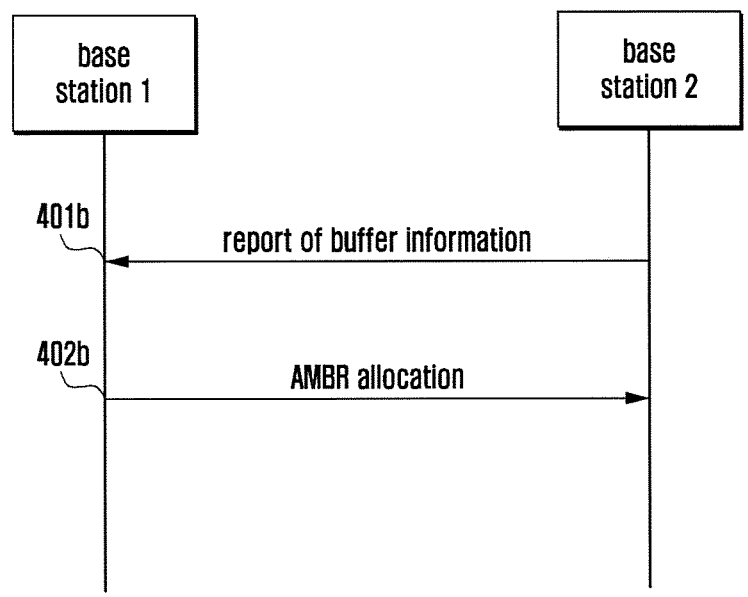
Figure 4C:
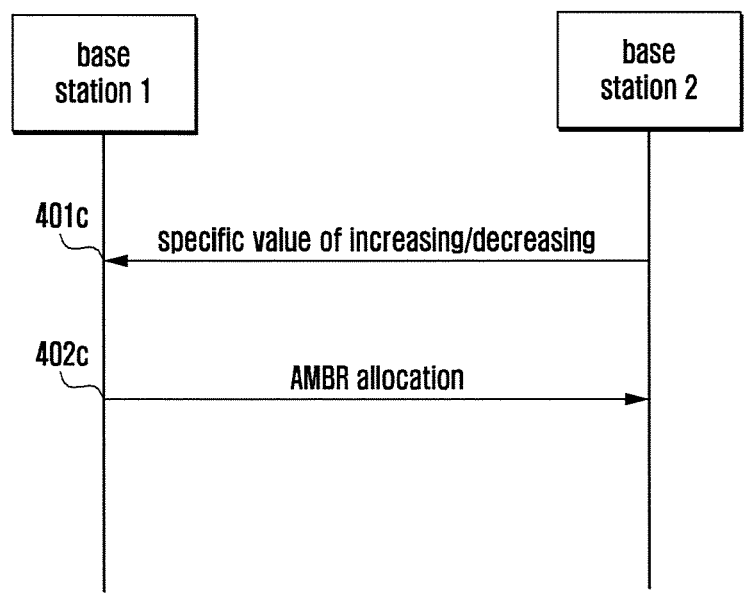
Figure 4D:
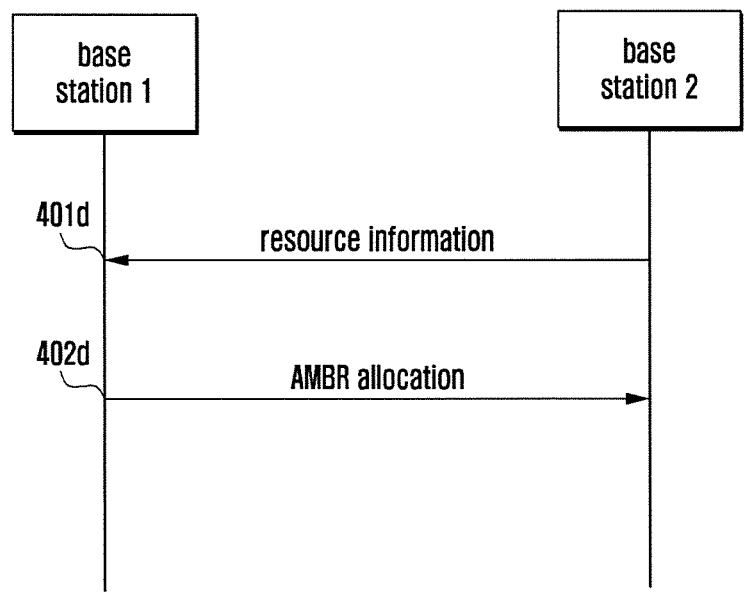
Figure 6:
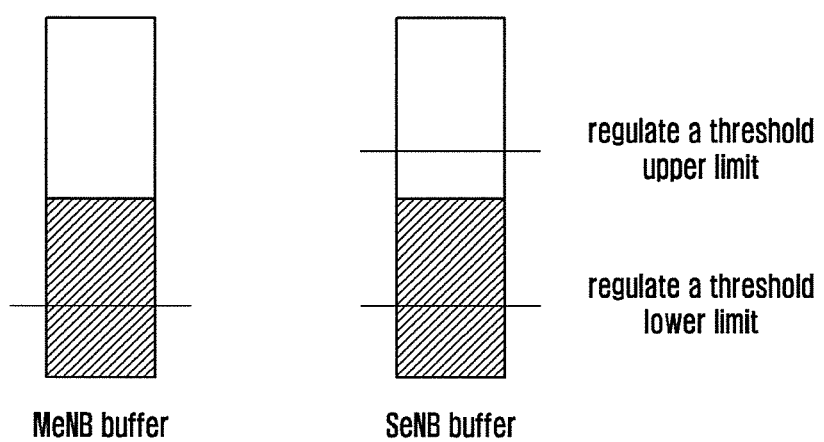
FIG. 6 is a schematic flowchart of a method for allocating the aggregate maximum bit rate of a base station according to the buffer information by the MeNB of a fourth embodiment of the present disclosure.

The embodiment provides four different implementation methods, method 1 as shown in FIG. 4A, method 2 as shown in FIG. 4B, method 3 as shown in FIG. 4C, and method 4 as shown in FIG. 4D.

The method 1 illustrated in FIG. 4A can include the following operations.

In operation 401a, the base station 2 sends an aggregate bit rate reporting message to the station 1. The message carries the UE identification on the X2 interface, and carries the aggregate bit rates of all the non-GBR services actually used by the base station 2 in the previous period of time. The message can be sent on an appointed period of time in the process, and thus the previous period of time is the previous appointed period of time. This process can also be triggered by an event, and the base station 2 reports the message when the actual used aggregate bit rate is larger or smaller than a threshold value according to appointment. The base station 2 reports the actual aggregate bit rate of the non-GBR service used by a UE in a period of time to the base station 1 by the message.

In operation 402a, the base station 1 sends a new AMBR to the base station 2. The base station 1 determines if it is needed to reallocate the AMBR, and sends the new AMBR to the base station 2 if it is needed.

The message can be transmitted to the SeNB by an X2 control plane message or by carrying it in a user plane packet.

The method 2 illustrated in FIG. 4B includes the following steps.

In step 401b, the base station 2 sends the station 1 a report of buffer information that carries buffer information of the non-GBR service on the base station 2.

The message carries the UE identification on the X2 interface, and carries the buffer information of all the non-GBR services of the base station 2 in the previous period of time. The message can be sent on an appointed period of time in the process, and thus the previous period of time is the previous appointed period of time. This process can also be triggered by an event, and the base station 2 reports the message when the buffer of all the non-GBR services is larger or smaller than a threshold value according to appointment. The base station 2 reports the buffer information of all the non-GBR services of a UE to the base station 1 by the message.

In step 402b, the base station 1 sends a new AMBR to the base station 2.

According to the methods provided by other embodiments of the present disclosure, the base station 1 determines if it is needed to reallocate the AMBR, and sends the new AMBR to the base station 2 if it is needed.

The message can be transmitted to the SeNB by the X2 control plane message or by carrying it in the user plane packet.

In some embodiments, there can be following implementation methods, and they are not shown in FIG. 4 for concision, because they are similar to the method 1 and the method 2 of FIG. 4 in the process.

Method 3 illustrated in FIG. 4C includes the following steps.

In step 401c, the base station 2 sends a request for increasing the AMBR to the base station 1, or sends a request for decreasing the AMBR to the base station 1. The message is to request the MeNB to increase or decrease the AMBR allocated to the UE, and can further include a specific value of increasing or decreasing.

The message carries the UE identification on the X2 interface, and it can be sent on an appointed period of time in the process, and thus the previous period of time is the previous appointed period of time. This process can also be triggered by an event.

In step 402c, the base station 1 sends a new AMBR to the base station 2.

According to the methods provided by other embodiments of the present disclosure, the base station 1 determines if it is needed to reallocate the AMBR, and sends the new AMBR to the base station 2 if it is needed.

The message can be transmitted to the SeNB by the X2 control plane message or by carrying it in the user plane packet.

Method 4 illustrated in FIG. 4D includes following steps.

In step 401d, the base station 2 sends a resource message to the base station 1, and the message carries available resource of the non-GBR service or used resource of the Non-GBR service on the base station 2. The resource can belong to a whole cell or a UE. The message can further include the number of the users on the base station 2 if the resource belongs to the cell, or the number of the users is sent to the MENB by another X2 message.

The message carries the UE identification on the X2 interface, and carries the resources of all the non-GBR services of the base station 2 in the previous period of time. The message can be sent on an appointed period of time in the process, and thus the previous period of time is the previous appointed period of time. This process can also be triggered by an event, and the base station 2 reports the message when the resources of all the non-GBR services are larger or smaller than a threshold value according to an appointment. The base station 2 reports the resources of all the non-GBR services of a UE or the cell to the base station 1 by the message.

In step 402d, the base station 1 sends a new AMBR to the base station 2.

According to the methods provided by other embodiments of the present disclosure, the base station 1 determines if it is needed to reallocate the AMBR, and sends the new AMBR to the base station 2 if it is needed.

According to another embodiment of the present disclosure, the master base station MeNB determines the AMBRs used by the MeNB and SeNB according to the QCI. The method shown in FIG. 5 can includes following several conditions, in the following description, it can be that the base station 1 is the MeNB and the base station 2 is the SeNB, or the base station 1 is the SeNB and the base station 2 is the MeNB.

1. The QCI of the non-GBR allocated on MeNB is the same as that allocated on SMeNB. At this point, the MeNB allocate the same AMBR to the MeNB and the SeNB, and the sum of both the AMBRs is equal to the UE-ABMR. For example, if the UE-AMBR is equal to 100, the AMBRs of the MeNB and the SeNB are 50 and 50 respectively.

2. The QCI of the non-GBR bearer established on the base station 1 is equal to 5, and the QCI of the non-GBR bearer established on the base station 2 is equal to 7. At this point, the MeNB allocate the same AMBR to the base station 1 and the base station 2, and the sum of both the AMBRs is equal to the UE-ABMR.

3. The QCI of the non-GBR bearer established on the base station 1 is equal to 5, and the QCI of the non-GBR bearer established on the base station 2 is equal to 8 or 9. At this point, the ratio of the AMBRs of the base station 1 and the base station 2 allocated by the MeNB is 1 to 3. The base station 1 can use a higher AMBR because the delay requirement for the bearer on the base station 1 is much shorter, and the priority of the base station 1 is much higher. The sum of both the AMBRs is equal to the UE-ABMR. For example, if the UE-AMBR is equal to 100, the AMBRs of the MeNB and the SeNB are 75 and 25, respectively.

4. The QCI of the non-GBR bearer established on the base station 1 is equal to 6, and the QCI of the non-GBR bearer established on the base station 2 is equal to 8 or 9. At this point, the MeNB allocate the same AMBR to the base station 1 and the base station 2, and the sum of both the AMBRs is equal to the UE-ABMR. For example, if the UE-AMBR is equal to 100, the AMBRs of the MeNB and the SeNB are 50 and 50, respectively.

5. The QCI of the non-GBR bearer established on the base station 1 is equal to 6, and the QCI of the non-GBR bearer established on the base station 2 is equal to 5 or 7. At this point, the ratio of the AMBRs of the base station 1 and the base station 2 allocated by the MeNB is 1 to 3, and the sum of both the AMBRs is equal to the UE-ABMR. For example, if the UE-AMBR is equal to 100, the AMBRs of the MeNB and the SeNB are 25 and 75 respectively.

According to another embodiment of the present disclosure, the master base station MeNB determines the AMBRs used by the MeNB and SeNB according to the buffer information. The method shown in FIG. 6 has the two regulation modes as follows.

Mode A1: the MeNB obtains the buffer information of the non-GBR service of the MeNB, and obtains the buffer information of the non-GBR service on the SeNB through the X2 interface, and will regulate the AMBR that can be available for the base station when the condition is satisfied. For example, threshold upper and lower limits are regulated on the buffer information of the non-GBR service. When the buffer of an eNB is higher than the upper limit and the buffer of another eNB is less than the lower limit, the MeNB can regulate the allocated AMBRs that are used by both the base stations, so as to allocate more AMBR to the base station of which the buffer is higher than the upper limit and allocate less AMBR to the base station of which the buffer is less than the lower limit. The sum of the AMBRs of both base stations is equal to the UE-AMBR. The new AMBR is sent to the SeNB through the X2 interface.

Mode A2: the MeNB regulates according to the difference of both buffer values. When the difference of both buffer values is larger than the threshold, the base station that actually uses larger buffer is allocated more AMBR and the base station that actually uses smaller buffer is allocated less AMBR. The sum of the AMBRs of both base stations is equal to the UE-AMBR. The new AMBR is sent to the SeNB through the X2 interface.

The method is also applied to the condition that the new AMBR is allocated according to the aggregate bit rates that are actually used by the MeNB and SeNB in the past period of time. Specifically, there are the two modes as follows.

Mode B1: the MeNB knows the aggregate bit rates of all the non-GBR services of the MeNB in the past period of time that are called historical aggregate bit rates of the MeNB. The aggregate bit rates of all the non-GBR services of the SeNB in the past period of time obtained by the X2 interface are called historical aggregate bit rates of the SeNB. The MeNB will regulate the AMBR that can be available for the base station when the condition is satisfied. For example, for the historical aggregate bit rates, two thresholds are set, and threshold upper and lower limits are regulated. When the historical aggregate bit rates of all the non-GBR services of an eNB are higher than the upper limit and that of another eNB are less than the lower limit, the MeNB can regulate the allocated AMBRs that are used by both base stations, so as to allocate more AMBR to the base station of which the historical aggregate bit rates are higher than the upper limit and allocate less AMBR to the base station of which the historical aggregate bit rates are less than the lower limit. The sum of the AMBRs of both base stations is equal to the UE-AMBR. The new AMBR is sent to the SeNB through the X2 interface.

Mode B2: the MeNB regulates according to the difference of both historical aggregate bit rates. When the difference is larger than the threshold, the base station with lower historical aggregate bit rate is allocated more AMBR and the base station with higher historical aggregate bit rate is allocated less AMBR. The sum of the AMBRs of both base stations is equal to the UE-AMBR. The new AMBR is sent to the SeNB through the X2 interface.

Figure 7:
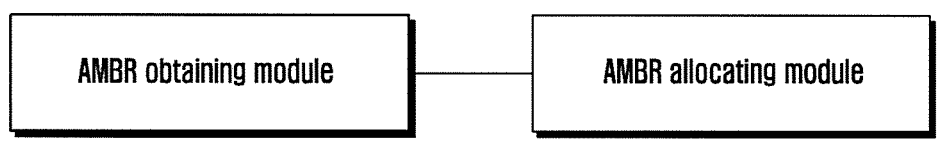
FIG. 7 is a composite structure diagram of a preferred base station of the present disclosure.
Figure 8:
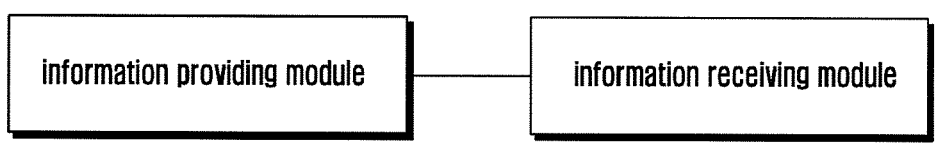
FIG. 8 is a composite structure diagram of another preferred base station of the present disclosure.

Corresponding to the above methods, the application provides two preferred base stations as shown in FIG. 7 and FIG. 8 respectively.

Referring to FIG. 7, the base station includes an AMBR obtaining module and an AMBR allocating module, wherein the AMBR obtaining module is configured to obtain an aggregate maximum bit rate (AMBR) of a UE (UE-AMBR) from the MME, and the AMBR allocating module is configured to obtain information for allocating an aggregate maximum bit rate of a secondary base station (SeNB) and allocate the aggregate maximum bit rate used by the secondary base station according to the information.

Referring to FIG. 8, the base station includes an information providing module and an information receiving module, wherein the information providing module is configured to send information for allocating an aggregate maximum bit rate (AMBR) of a SeNB to a MeNB, and the information receiving module is configured to receive the AMBR allocated by the MeNB.

Although the present disclosure has been described with embodiments, various changes and modifications may be suggested to one skilled in the art. It is intended that the present disclosure encompass such changes and modifications as fall within the scope of the appended claims.

What is claimed is:

1. A method by a master base station (MeNB) for allocating an aggregate maximum bit rate (AMBR) of a user equipment (UE), the method comprising:
   receiving, from a mobile management entity (MME), the AMBR of the UE (UE-AMBR); receiving, from a secondary base station (SeNB), information for allocating an AMBR of the SeNB,
   wherein the information includes a requirement for a quality of service of a non-guaranteed bit rate (non-GBR) service bearer established on the SeNB, a delay requirement for the non-GBR service bearer established on the SeNB, a historical aggregate bit rate of the non-GBR service on the SeNB, and information on a buffer of the non-GBR service bearer established on the SeNB; and
   allocating the AMBR of the SeNB based on the information,
   wherein a sum of an AMBR of the MeNB and the AMBR of the SeNB is not greater than the UE-AMBR,
   wherein the AMBR of the SeNB is allocated according to a ratio between the delay requirement for the non-GBR service bearer established on the SeNB and a delay requirement for a non-GBR service bearer established on the MeNB,
   wherein in response to the historical aggregate bit rate of the non-GBR service on the SeNB being above a first upper threshold and a historical aggregate bit rate of the non-GBR service on the MeNB being below a first lower threshold, the AMBR of the SeNB is allocated greater than the AMBR of the MeNB,
   in response to the historical aggregate bit rate of the non-GBR service on the SeNB being below the first lower threshold and the historical aggregate bit rate of the non-GBR service on the MeNB being above the first upper threshold, the AMBR of the SeNB is allocated less than the AMBR of the MeNB, and
   in response to a difference of the historical aggregate bit rate of the non-GBR service on the SeNB and the historical aggregate bit rate of the non-GBR service on the MeNB being larger than a first threshold and the historical aggregate bit rate of the non-GBR service on the SeNB being greater than the historical aggregate bit rate of the non-GBR service on the MeNB, the AMBR of the SeNB is allocated greater than the AMBR of the MeNB, and
   wherein in response to the buffer of the non-GBR service bearer established on the SeNB being above a second upper threshold and a buffer of the non-GBR service bearer established on the MeNB being below a second lower threshold, the AMBR of the SeNB is allocated greater than the AMBR of the MeNB,
   in response to the buffer of the non-GBR service bearer established on the SeNB being below the second lower threshold and a buffer of the non-GBR service bearer established on the MeNB being above the second upper threshold, the AMBR of the SeNB is allocated less than the AMBR of the MeNB, and
   in response to a difference of the buffer of the non-GBR service bearer established on the SeNB and the buffer of the non-GBR service bearer established on the MeNB being larger than a second threshold and the buffer of the non-GBR service bearer established on the SeNB being greater than the buffer of the non-GBR service bearer established on the MeNB, the AMBR of the SeNB is allocated greater than the AMBR of the MeNB.

2. The method of claim 1, wherein, the UE-AMBR is a highest aggregate bit rate of all non-GBR services of the UE.

3. The method of claim 1, wherein, the information for allocating the AMBR of the SeNB further comprises at least one of:
   a resource status of the non-GBR service on the SeNB;
   a current aggregate bit rate of a non-GBR service on the SeNB; or
   a requirement of an increase or a decrease from the SeNB.

4. The method of claim 3, further comprising receiving the buffer information of the non-GBR service bearer on the SeNB from the SeNB.

5. The method of claim 1, further comprising receiving a current aggregate bit rate of a non-GBR service on the SeNB or the historical aggregate bit rate of the non-GBR service on the SeNB from the SeNB.

6. A master base station (MeNB) in a wireless communication system, the MeNB comprising:
an aggregate maximum bit rate (AMBR) receiver configured to receive, from a mobile management entity (MME), an AMBR of a user equipment (UE) (UE-AMBR); and
an AMBR allocator configured to:
receive information, from a secondary base station (SeNB), for allocating an AMBR of the SeNB,
wherein the information includes a requirement for a quality of service of a non-guaranteed bit rate (non-GBR) service bearer established on the SeNB, a delay requirement for the non-GBR service bearer established on the SeNB, a historical aggregate bit rate of the non-GBR service on the SeNB, and information on a buffer of the non-GBR service bearer established on the SeNB; and
allocate the AMBR of the SeNB based on the information,
wherein a sum of an AMBR of the MeNB and the AMBR of the SeNB is not greater than the UE-AMBR,
wherein the AMBR of the SeNB is allocated according to a ratio between the delay requirement for the non-GBR service bearer established on the SeNB and a delay requirement for a non-GBR service bearer established on the MeNB,
wherein in response to the historical aggregate bit rate of the non-GBR service on the SeNB being above a first upper threshold and a historical aggregate bit rate of the non-GBR service on the MeNB being below a first lower threshold, the AMBR of the SeNB is allocated greater than the AMBR of the MeNB,
in response to the historical aggregate bit rate of the non-GBR service on the SeNB being below the first lower threshold and the historical aggregate bit rate of the non-GBR service on the MeNB being above the first upper threshold, the AMBR of the SeNB is allocated less than the AMBR of the MeNB, and
in response to a difference of the historical aggregate bit rate of the non-GBR service on the SeNB and the historical aggregate bit rate of the non-GBR service on the MeNB being larger than a first threshold and the historical aggregate bit rate of the non-GBR service on the SeNB being greater than the historical aggregate bit rate of the non-GBR service on the MeNB, the AMBR of the SeNB is allocated greater than the AMBR of the MeNB, and
wherein in response to the buffer of the non-GBR service hearer established on the SeNB being above a second upper threshold and a buffer of the non-GBR service bearer established on the MeNB being below a second lower threshold, the AMBR of the SeNB is allocated greater than the AMBR of the MeNB,
in response to the buffer of the non-GBR service bearer established on the SeNB being below the second lower threshold and a buffer of the non-GBR service bearer established on the MeNB being above the second upper threshold, the AMBR of the SeNB is allocated less than the AMBR of the MeNB, and
in response to a difference of the buffer of the non-GBR service bearer established on the SeNB and the buffer of the non-GBR service hearer established on the MeNB being larger than a second threshold and the buffer of the non-GBR service bearer established on the SeNB being greater than the buffer of the non-GBR service bearer established on the MeNB, the AMBR of the SeNB is allocated greater than the AMBR of the MeNB.

7. The MeNB of claim 6, wherein the UE-AMBR is a highest aggregate bit rate of all of non-GBR services of the UE.

8. The MeNB of claim 6, wherein the information for allocating the AMBR of the SeNB further comprises at least one of:
a resource status of the non-GBR service on the SeNB;
a current aggregate bit rate of a non-GBR service on the SeNB or
a requirement of an increase or a decrease from the SeNB.

9. The MeNB of claim 8, wherein a controller is further configured to receive the buffer information of the non-GBR service bearer on the SeNB from the SeNB.

10. The MeNB of claim 6, wherein a controller is further configured to receive a current aggregate bit rate of a non-GBR service on the SeNB or the historical aggregate bit rate of the non-GBR service on the SeNB from the SeNB.

11. A method by a secondary base station (SeNB) for coordinating aggregate maximum bit rate (AMBR) of non-GBR services between base stations, the method comprising:
sending, to a master base station (MeNB), information for allocating an AMBR of the SeNB,
wherein the information includes a requirement for a quality of service of a non-guaranteed bit rate (non-GBR) service bearer established on the SeNB, a delay requirement for the non-GBR service bearer established on the SeNB, a historical aggregate bit rate of the non-GBR service on the SeNB, and information on a buffer of the non-GBR service bearer established on the SeNB; and
receiving, from the MeNB, the AMBR of the SeNB allocated by the MeNB,
wherein the AMBR of the SeNB is allocated based on the information,
wherein a sum of an AMBR of the MeNB and the AMBR of the SeNB is not greater than the AMBR of a user equipment (UE) (UE-AMBR), and
wherein the AMBR of the SeNB is allocated according to a ratio between the delay requirement for the non-GBR service bearer established on the SeNB and a delay requirement for a non-GBR service bearer established on the MeNB,
wherein in response to the historical aggregate bit rate of the non-GBR service on the SeNB being above a first upper threshold and a historical aggregate bit rate of the non-GBR service on the MeNB being below a first lower threshold, the AMBR of the SeNB is allocated greater than the AMBR of the MeNB,
in response to the historical aggregate bit rate of the non-GBR service on the SeNB is below the first lower threshold and the historical aggregate bit rate of the non-GBR service on the MeNB being above the first upper threshold, the AMBR of the SeNB is allocated less than the AMBR of the MeNB, and
in response to a difference of the historical aggregate bit rate of the non-GBR service on the SeNB and the historical aggregate bit rate of the non-GBR service on the MeNB being larger than a first threshold and the historical aggregate bit rate of the non-GBR service on the SeNB being greater than the historical aggregate bit rate of the non-GBR service on the MeNB the AMBR of the SeNB is allocated greater than the AMBR of the MeNB, and wherein in response to the buffer of the non-GBR service hearer established on the SeNB being above a second upper threshold and a buffer of the non-GBR service bearer established on the MeNB being below a second lower threshold, the AMBR of the SeNB is allocated greater than the AMBR of the MeNB, in response to the buffer of the non-GBR service bearer established on the SeNB being below the second lower threshold and a buffer of the non-GBR service bearer established on the MeNB being above the second upper threshold, the AMBR of the SeNB is allocated less than the AMBR of the MeNB, and in response to a difference of the buffer of the non-GBR service bearer established on the SeNB and the buffer of the non-GBR service bearer established on the MeNB being larger than a second threshold and the buffer of the non-GBR service bearer established on the SeNB being greater than the buffer of the non-GBR service bearer established on the MeNB, the AMBR of the SeNB is allocated greater than the AMBR of the MeNB.

12. The method of claim 11, wherein the information for allocating the AMBR of the SeNB further comprises at least one of:

a resource status of the non-GBR service on the SeNB;
a current aggregate bit rate of a non-GBR service on the SeNB; or
a requirement of an increase or a decrease from the SeNB.

13. The method of claim 12, further comprising transmitting the buffer information of the non-GBR service bearer on the SeNB to the MeNB.

14. The method of claim 11, wherein the AMBR allocated by the MeNB is received through an X2 signal or an X2 user plane.

15. The method of claim 11, further comprising transmitting a current aggregate bit rate of a non-GBR service on the SeNB or the historical aggregate bit rate of the non-GBR service on the SeNB to the MeNB.

16. A secondary base station (SeNB) in a wireless communication system, the SeNB comprising:

an information provider configured to send, to a master base station (MeNB), information for allocating an aggregate maximum bit rate (AMBR) of the secondary base station (SeNB), wherein the information includes a requirement for a quality of service of a non-guaranteed bit rate (non-GBR) service bearer established on the SeNB a delay requirement, for the non-GBR service bearer established on the SeNB, a historical aggregate bit rate of the non-GBR service on the SeNB, and information on a buffer of the non-GBR service bearer established on the SeNB; and an information receiver configured to receive the AMBR of the SeNB allocated by the MeNB, wherein the AMBR of the SeNB is allocated based on the information, wherein a sum of an AMBR of the MeNB and the AMBR of the SeNB is not greater than the AMBR of a user equipment (UE) (UE-AMBR), and wherein the AMBR of the SeNB is allocated according to a ratio between the delay requirement for the non-GBR service bearer established on the SeNB and a delay requirement for a non-GBR service hearer established on the MeNB, wherein in response to the historical aggregate bit rate of the non-GBR service on the SeNB being above a first upper threshold and a historical aggregate bit rate of the non-GBR service on the MeNB being below a first lower threshold, the AMBR of the SeNB is allocated greater than the AMBR of the MeNB, in response to the historical aggregate bit rate of the non-GBR service on the SeNB being below the first lower threshold and the historical aggregate, bit rate of the non-GBR service on the MeNB being above the first upper threshold, the AMBR of the SeNB is allocated less than the AMBR of the MeNB, and in response to a difference of the historical aggregate bit rate of the non-GBR service on the SeNB and the historical aggregate bit rate of the non-GBR service on the MeNB being larger than a first threshold and the historical aggregate bit rate of the non-GBR service on the SeNB being greater than the historical aggregate bit rate of the non-GBR service on the MeNB, the AMBR of the SeNB is allocated greater than the AMBR of the MeNB, and wherein in response to the buffer of the non-GBR service bearer established on the SeNB being above a second upper threshold and a buffer of the non-GBR service bearer established on the MeNB being below a second lower threshold, the AMBR of the SeNB is allocated greater than the AMBR of the MeNB, in response to the buffer of the non-GBR service bearer established on the SeNB being below the second lower threshold and a buffer of the non-GBR service bearer established on the MeNB being above the second upper threshold, the AMBR of the SeNB is allocated less than the AMBR of the MeNB, and in response to a difference of the buffer of the non-GBR service bearer established on the SeNB and the buffer of the non-GBR service bearer established on the MeNB being larger than a second threshold and the buffer of the non-GBR service bearer established on the SeNB being greater than the buffer of the non-GBR service bearer established on the MeNB, the AMBR of the SeNB is allocated greater than the AMBR of the MeNB.

17. The SeNB of claim 16, wherein the information for allocating the AMBR of the SeNB further comprises at least one of:

a resource status of the non-GBR service on the SeNB;
a current aggregate bit rate of a non-GBR service on the SeNB; or
a requirement of an increase or a decrease from the SeNB.

18. The SeNB of claim 17, wherein a controller is further configured to transmit the buffer information of the non-GBR service bearer on the SeNB to the MeNB.

19. The SeNB of claim 16, wherein the AMBR allocated by the MeNB is received through an X2 signal or an X2 user plane.

20. The SeNB of claim 16, wherein a controller is further configured to transmit a current aggregate bit rate of a non-GBR service on the SeNB or the historical aggregate bit rate of the non-GBR service on the SeNB to the MeNB.

* * * * *